United States Patent
Little, Jr.

[11] Patent Number: 6,160,938
[45] Date of Patent: Dec. 12, 2000

[54] CONCENTRIC LAY STRANDING FOR OPTICAL FIBER CABLE

[76] Inventor: William D. Little, Jr., P.O. Box 541204, Dallas, Tex. 75354-1204

[21] Appl. No.: 09/293,566

[22] Filed: Apr. 15, 1999

[51] Int. Cl.[7] ......................................................... G02B 6/44
[52] U.S. Cl. .......................... 385/104; 385/901; 385/103
[58] Field of Search ................................... 385/102, 103, 385/104, 111, 901

[56] References Cited

U.S. PATENT DOCUMENTS

| | | | |
|---|---|---|---|
| 3,937,559 | 2/1976 | Ferrentino et al. | 350/96 |
| 4,154,049 | 5/1979 | King et al. | 57/9 |
| 4,185,887 | 1/1980 | Ferrentino | 350/96.23 |
| 4,474,426 | 10/1984 | Yataki | 350/96.23 |
| 4,763,984 | 8/1988 | Awai et al. | 350/96.24 |
| 4,825,341 | 4/1989 | Awai | 362/32 |
| 4,881,795 | 11/1989 | Cooper | 350/96.23 |
| 4,902,096 | 2/1990 | Calzolari et al. | 350/96.23 |
| 4,922,385 | 5/1990 | Awai | 362/32 |
| 4,956,039 | 9/1990 | Olesen et al. | 156/180 |
| 4,966,434 | 10/1990 | Yonechi et al. | 350/96.23 |
| 4,993,804 | 2/1991 | Mayr et al. | 350/96.23 |
| 5,016,152 | 5/1991 | Awai et al. | 362/293 |
| 5,031,995 | 7/1991 | Pinson | 350/96.23 |
| 5,136,673 | 8/1992 | Yoshizawa et al. | 385/103 |
| 5,253,318 | 10/1993 | Sayegh et al. | 385/114 |
| 5,333,228 | 7/1994 | Kingstone | 385/100 |
| 5,345,531 | 9/1994 | Keplinger et al. | 385/102 |
| 5,416,875 | 5/1995 | Keplinger et al. | 385/102 |
| 5,440,659 | 8/1995 | Bergano et al. | 385/100 |
| 5,479,322 | 12/1995 | Kacheria | 362/32 |
| 5,509,097 | 4/1996 | Tondi-Resta | 385/113 |
| 5,528,714 | 6/1996 | Kingstone et al. | 385/100 |
| 5,542,016 | 7/1996 | Kaschke | 385/123 |
| 5,602,948 | 2/1997 | Currie | 585/33 |
| 5,617,496 | 4/1997 | Kingstone | 385/100 |
| 5,617,497 | 4/1997 | Kingstone | 385/100 |
| 5,671,837 | 9/1997 | Tryon et al. | 40/547 |
| 5,708,749 | 1/1998 | Kacheria | 385/123 |
| 5,751,879 | 5/1998 | Graham et al. | 385/103 |
| 5,779,353 | 7/1998 | Kacheria | 362/293 |
| 5,789,471 | 8/1998 | Caruso | 524/161 |
| 5,791,758 | 8/1998 | Horgan et al. | 362/32 |
| 5,838,860 | 11/1998 | Kingstone et al. | 385/100 |
| 5,995,702 | 11/1999 | Tjonneland | 385/901 |

*Primary Examiner*—Hung N. Ngo
*Attorney, Agent, or Firm*—Dennis T. Griggs

[57] ABSTRACT

Multiple groups of optical fibers are laid in concentric helical layers around a central core. A first layer is wound or laid around the core with adjacent lap segments touching each other, thus eliminating axial spacing between the lap segments along the core. The next group contains a greater number of optical fibers and is helically laid around the first layer, with adjacent lap segments touching each other. This winding process is continued, with the number of optical fibers in each successive winding group progressively increasing until a desired cable diameter is obtained. Improved surface uniformity is provided by laying the helical layers with a reversed direction of lay and with increased length of lay in each successive layer. According to another arrangement, improved luminosity is provided by laying the helical layers with reversed direction of lay and with the same length of lay in each successive layer. Additionally, a tighter (relatively dense) packing of fiber is provided by laying the helical layers with the same direction of lay and with the same length of lay for each successive layer.

9 Claims, 3 Drawing Sheets

CONCENTRIC LAY STRANDING FOR OPTICAL FIBER CABLE

BACKGROUND OF THE INVENTION

This invention relates generally to fiber optic lighting, and in particular to a method for manufacturing a fiber optic cable for use in side lighting applications.

Fiber optics is the technique of transmitting light through long, thin, flexible fibers or filaments of glass, plastic or other transparent materials. A bundle of fibers is referred to as a fiber optic cable. Conventional fiber optic cables include a core of optical fibers around which one or more layers of optical fibers are spirally wound and are enclosed within a transparent sheath. An optical fiber is a cylindrical dielectric wave guide of small diameter made of a low-loss material, usually fused silica glass or a polymer of high chemical purity and high refractive index.

Optical fiber cables are used for transmitting light for illumination purposes, either in a longitudinal mode in which light is transmitted from an originating point to a receiving point, or in a "side light" lateral operating mode in which light is emitted laterally or radially along the entire length of the fiber optic cable. Typically, fiber optic cables are operated in the lateral or side lighting mode for decorative lighting, recessed indoor lighting, around swimming pools and walkways and in indoor applications where soft accent lighting is desired.

Fiber optic cables configured for side lighting applications are constructed in lengths which may vary from a few feet to one hundred feet or more. In a typical side lighting application in which a long fiber optic cable is used, the cable is coupled at one or both of its ends to receive light from a high intensity light source. When illuminated, the optical cable glows, thus providing essentially the same side illumination pattern that would be expected to be produced by a tubular incandescent or fluorescent luminaire.

Although the side light fiber optic cable is not as efficient as a conventional fluorescent or incandescent luminaire, it offers several advantages in that the fiber optic cable can be extended remotely from the light source itself, and can be curved to conform to a particular pattern or to form a continuous border around an object or area to be illuminated. Accordingly, a single continuous length of fiber optic cable can replace multiple incandescent light fixtures, for example in area lighting around a swimming pool, patio, garden area or around a walkway. Moreover, the fiber optic cable produces a soft glow, which cannot be duplicated by incandescent or fluorescent lighting, and therefore is useful for creating special indoor lighting effects, for example hi-lighting three-dimensional art objects and wall paintings.

Conventional fiber optic cable arrangements useful for side lighting applications are relatively inefficient as compared to conventional fluorescent and incandescent luminaires. A further limitation on the use of conventional fiber optic cable is that the spiral winding pattern is visible and thus detracts from the soft, uniform glow lighting effect that is desired for many direct illumination applications in which the fiber optic cable is visible. Moreover, the spiral winding pattern is accentuated when the fiber optic cable is illuminated by a colored light source.

Another limitation on the use of conventional fiber optic cables relates to termination of the cable. The fiber optic strands must be cut and terminated cleanly without smearing or beveling the ends that are closely coupled to the light source. Conventional fiber optic cables that are spiral-wound cannot be cut cleanly, in part because the fiber strands are not uniformly centered and thus cannot provide uniform inter-strand support as the strands are being sheared.

Conventional optical fiber cables adapted for side light lateral operation are exemplified by U.S. Pat. No. 5,416,875 entitled "Optical Fiber Lighting Apparatus and Method," which discloses an optical fiber cable having a bunch-twisted, multiple strand core with multiple stranded bundles laid in a spiral pattern around the core. U.S. Pat. No. 5,617,497 entitled "Lateral Illumination Fiber Optic Cable Device and Method of Manufacture," discloses a similar winding arrangement in which multiple stranded bundles are laid in a spiral pattern around a tubular core.

BRIEF SUMMARY OF THE INVENTION

The fiber optic cable of the preferred embodiment of the present invention includes one or more central fibers or strands forming a winding core, and multiple groups of optical fibers that are laid in concentric helical layers around the core in a uniform concentric layering arrangement. According to the preferred embodiment of the invention, a core consisting of one or more fibers or strands is provided, and a first layer containing multiple optical fibers, for example six fibers, is helically laid around the core in concentric relation with the longitudinal axis of the core and with the outer strand boundaries of adjacent lap segments contacting each other, thus eliminating any axial spacing between the lap segments along the length of the cable. Next, a second group containing a greater number of optical fibers, for example twelve fibers, is helically laid around the first group in concentric relation to the longitudinal axis of the core, with the outer strand boundaries of adjacent lap segments touching each other. This winding process is continued, with the number of optical fibers in each successive winding group progressively increasing, until a desired cable diameter is obtained. The finished optical cable is enclosed within a transparent sheath.

Improved surface uniformity is provided by laying the helical layers with a reversed direction of lay and with increased length of lay in each successive layer. According to another arrangement, improved luminosity is provided by laying the helical layers with reversed direction of lay and with the same length of lay in each successive layer. Additionally, a tighter (relatively dense) packing of fibers is provided by laying the helical layers with the same direction of lay and with the same length of lay in each successive layer.

These winding arrangements provide a smooth, substantially undifferentiated surface appearance. That is, because the adjacent helical winding laps are in contact with each other, variations in the outer surface of the cable are minimized and the spiral winding pattern is subdued. When illuminated, the optical cable glows uniformly, thus providing essentially the same side illumination pattern that would be expected to be produced by one or more tubular (cylindrical) incandescent or fluorescent luminaires of comparable length.

Another advantage of the uniform concentric layering arrangement is that because the fibers within each spiral winding group are in contact with each other, there is no axial spacing between individual fibers or between adjacent ribbon lap segments. Consequently, the adjacent fiber strands provide uniform support for each other with no inter-lap cross-over or layer shifting, thus providing a dimensionally stable core of uniform cross-section that can be cut and terminated cleanly without smearing or beveling of the fiber terminations.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1:
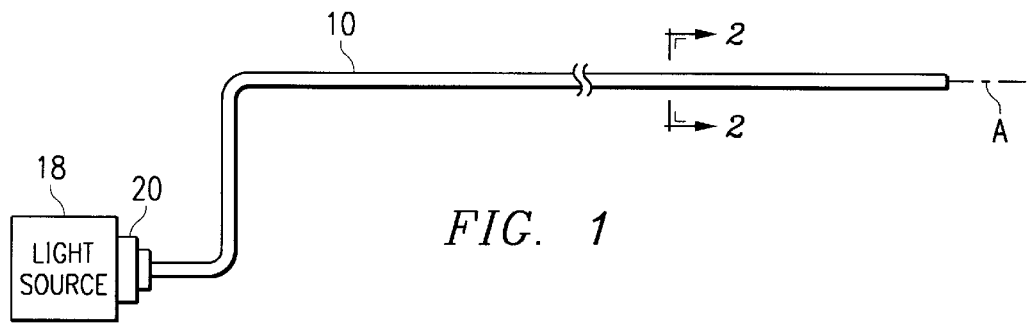
FIG. 1 is side elevational view of a lateral illumination fiber optic cable system constructed according to the present invention.

Preferred embodiments of the invention will now be described with reference to various examples of how the invention can best be made and used. Like reference numerals are used throughout the description and several views of the drawing to indicate like or corresponding parts.

The lay of any helical strand of a fiber optic cable is the axial length of a complete turn or lap of the helix of that element. That is, if a single fiber optic strand is unwound, the lay in inches will be that length as measured along the axis of the cable that is required for that strand to make one complete turn around the longitudinal axis of the cable.

The direction of lay is the lateral direction in which the fiber strands run over the top of the cable as they recede from an observer who looks along the axis of the cable. For purposes of the present invention, either a left-hand lay or a right-hand lay arrangement can be used.

Figure 6:
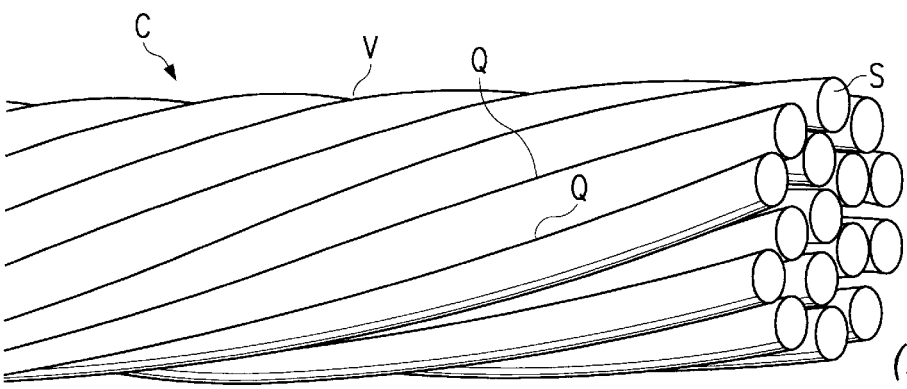

Conventional fiber optic cables consist of many fiber strands of the same diameter bunch-twisted together in the same direction without regard to the geometric arrangement of the individual strands, as illustrated by the bunch-twisted cable C shown in FIG. 6. This conventional spiral winding pattern is not likely to have a uniform cross-section because the strands S tend to cross-over each other and migrate from one layer to another during the twisting operation. The spiral winding pattern is conspicuous because of the relatively deep, irregular surface valleys V formed between adjacent strands S. The irregular distribution of strands in combination with the irregular valleys produce shadows which appear as dark striations Q when the optical fibers are illuminated.

Moreover, because of the irregular distribution, the fiber optic strands S are movable with respect to each other in response to a shearing force, resulting in a smearing or beveling deformation of the fiber strand termination. The efficiency of light transmission is a function of the effective optical cross-sectional area presented by the multiple fiber strands. Consequently, any smearing or beveling of fiber terminations will reduce the overall optical efficiency.

Figure 2:
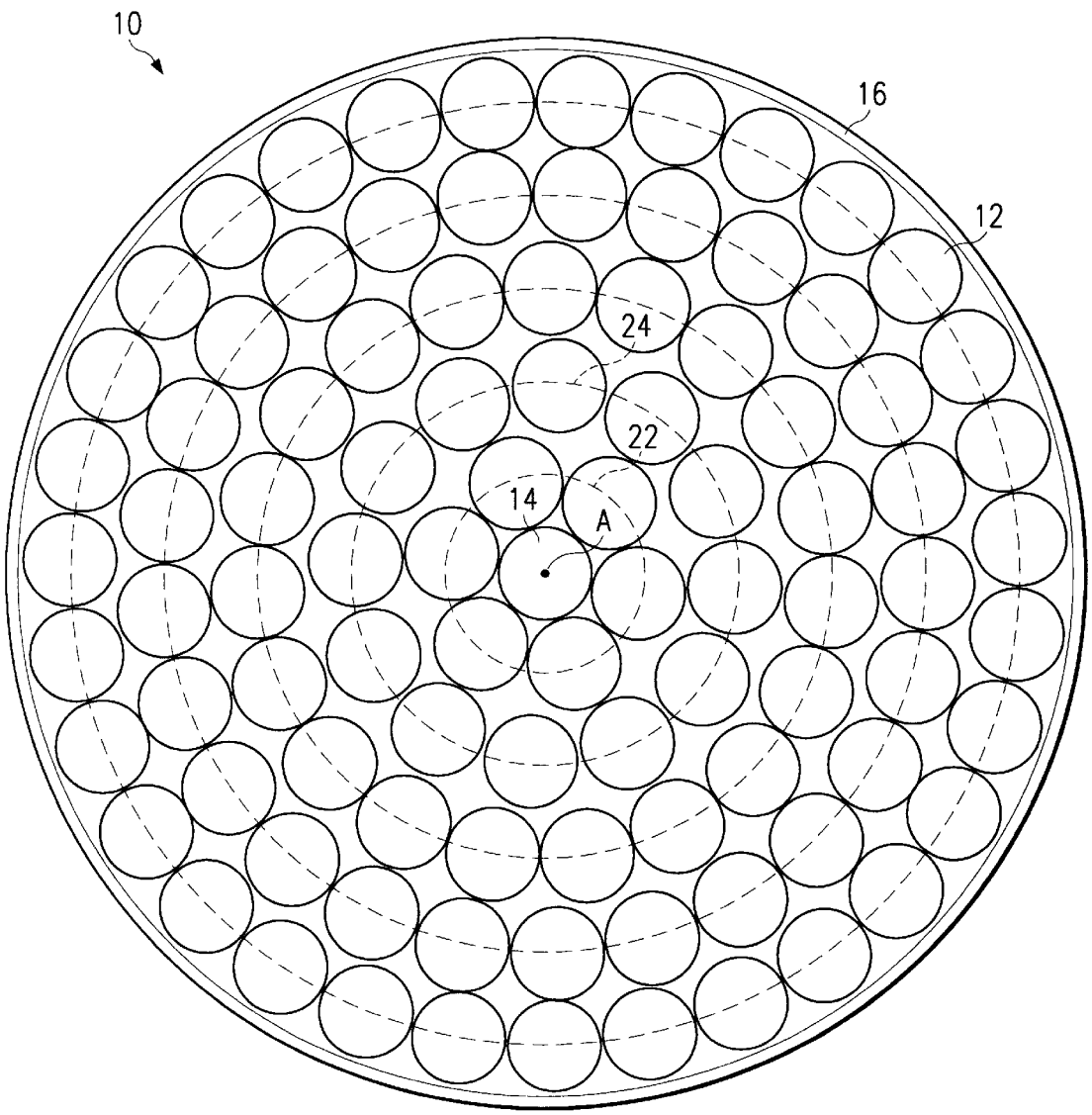
FIG. 2 is an enlarged cross-section view of the lateral illumination fiber optic cable shown in FIG. 1.

The foregoing limitations are overcome according to the present invention by a fiber optic cable 10, illustrated in FIG. 1 and FIG. 2, which includes multiple optical fibers 12 that are laid in a progressive lap winding arrangement about a central core. In this arrangement, multiple groups of optical fibers are helically wound or lapped about a single strand core 14 with the outer boundary fibers of adjacent lap segments touching each other.

The number of strands in each successive layer for the single-stranded embodiment is given by the following series: 1, 6, 12, 19, 25, 31, . . .

Figure 3:
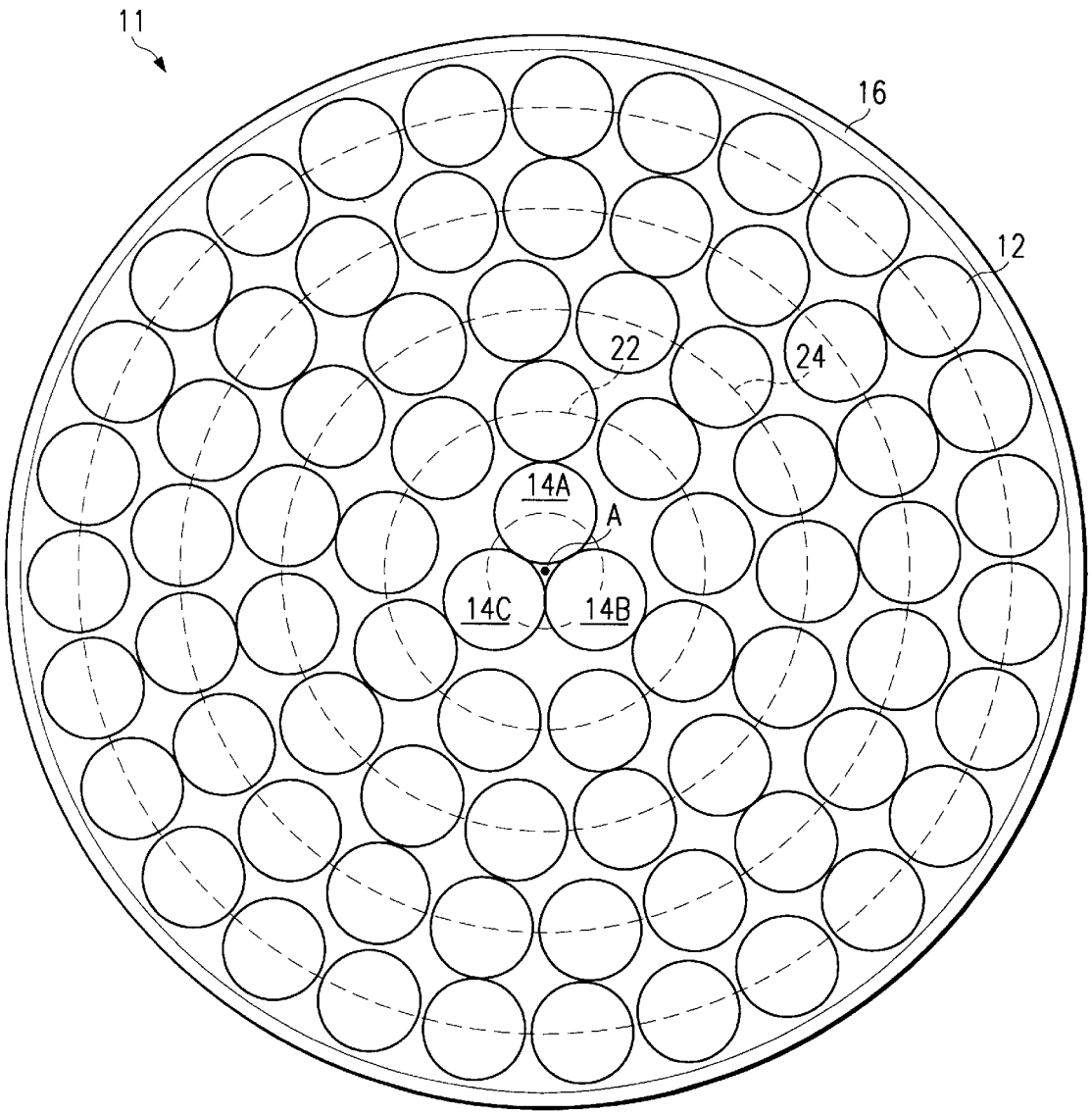
FIG. 3 is an enlarged cross-section view of a lateral illumination fiber optic cable having a core consisting of multiple optical fibers.

Referring now to FIG. 3, an alternative optical fiber winding arrangement includes multiple optical fibers 12 that are laid in a progressive lap winding arrangement about a central core which consists of three fibers or strands 14A, 14B and 14C. For the three-stranded core arrangement, the number of fiber optic strands in each successive layer is given by the following series: 3, 9, 15, 21, 27, . . .

The number o strands in each layer can be calculated for a particular core diameter H containing multiple strands by the formula disclosed below. The helically wound fibers are enclosed within a flexible, tubular sheath 16 made of a flexible, optically transparent material. One end of the fiber optic cable 10 is removably coupled to a high intensity light source 18 by a ferrule connector 20. According to this arrangement, the high intensity light produced by the light source 18 is conducted by each fiber strand 12 along the entire length of the fiber optic cable 10, and the light flux is emitted radially and substantially uniformly along its length.

Figure 4:
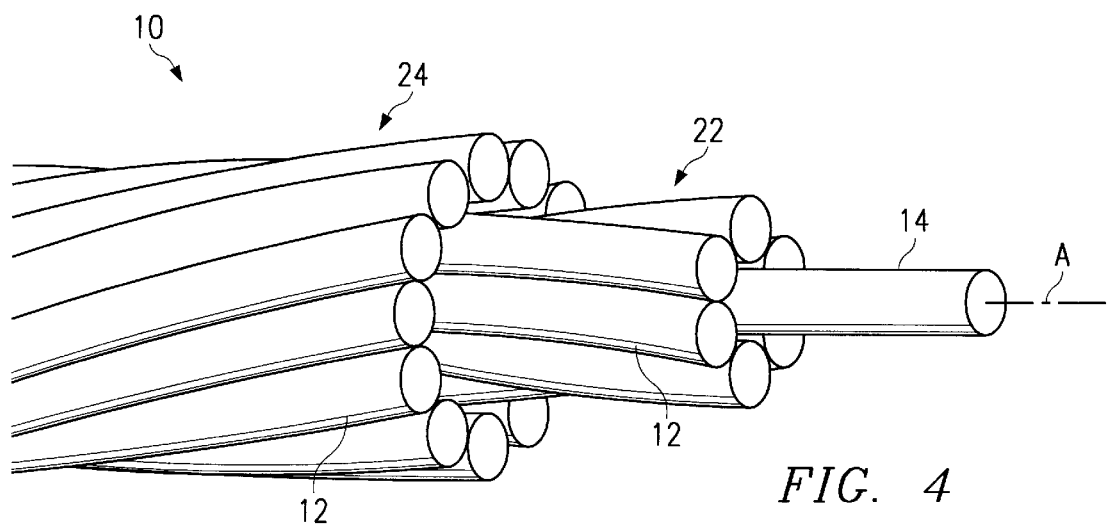
FIG. 4 is a perspective view of a segment of the lateral illumination fiber optic cable of FIG. 2 in which the optical fibers are laid in a true concentric pattern.

According to one aspect of the present invention, one or more central fibers or strands form a winding core 14, and multiple groups of optical fibers are laid in concentric helical layers 22 and 24 around the core 14. As illustrated in FIG. 4, the helical layers 22 and 24 are laid in substantially true concentric relation to the longitudinal axis A of the central core 14 and have a reversed direction of lay and an increased length of lay for each successive layer. Improved surface uniformity is provided by laying the helical layers with a reversed direction of lay and with increased length of lay for each successive layer.

According to a variation of the FIG. 4 embodiment, the cable 10 consists of two or more layers of helically laid strands, with the same direction of lay and the same length of lay for each successive layer. A tighter (relatively dense) packing of fibers is provided by laying the helical layers with the same direction of lay and with the same length of lay for each successive layer.

Figure 5:
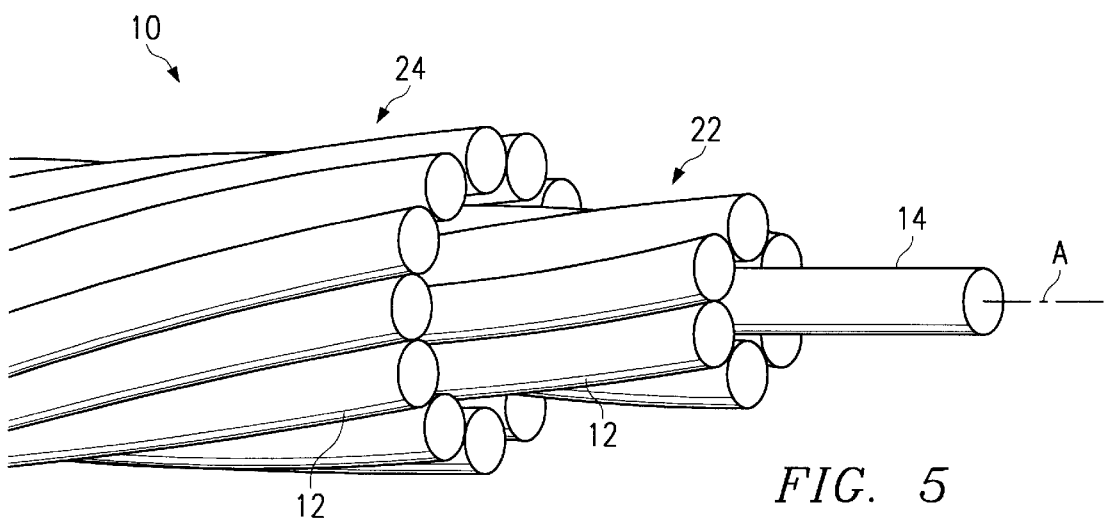
FIG. 5 is a perspective view of the lateral illumination fiber optic cable of FIG. 2 in accordance with an alternative winding embodiment in which the optical fibers are laid in a unidirectional concentric pattern; and, FIG. 6 is a perspective view, partially broken away, of a lateral illumination fiber optic cable constructed according to the prior art bunch-twisted stranding technique.

Referring now to FIG. 5, the helical layers 22. 24 are laid according to an alternative winding arrangement in which the concentric layers consist of two or more layers of helically laid fiber strands, with a reversed direction of lay and the same length of lay for each successive layer. Improved luminosity is provided by laying the helical layers with reversed direction of lay and with the same length of lay for each successive layer.

According to a unidirectional concentric variation of the FIG. 5 embodiment, a central fiber or strand 14 forms the core for two more layers 22, 24 of helically laid strands, having the same direction of lay, and an increased length of lay for each successive layer.

By reversing the direction of lay, uniform color and brightness are obtained while maintaining apparent light uniformity. Additionally, by reversing the direction of lay, a cancellation of rotational color change (the "candy cane" or "barber pole" effect) is eliminated. Generally, it is desirable to minimize the length of the optical fibers, and maintain a substantial constant length of fibers within each winding layer. This equalizes attenuation per strand, while minimizing color shift due to absorption of light in the red spectrum, which causes a blue/lavender/green color effect.

The optical fibers 12 preferably have a diameter in the range of 0.7 mm to 3 mm. Although the central core is disclosed as consisting of one or more optical fibers, the core 14 could be constructed of passive (non-conductive) fibers or strands, for example made of a synthetic polymer material such as nylon, either white, black or opaque. Alternatively, the non-conductive core could be realized by a passive, non-conductive tubular member having the desired core diameter. Typically, the core 14 is formed by 1–30 fiber optic strands each having a diameter in the range of 0.7 mm–3.0 mm.

According to an important feature of the invention, the single stranded core and multiple stranded core fiber optic cable embodiments are constructed with substantially uniform, concentric radial layering of optical fibers laid in a progressive lap winding arrangement. Multiple groups of optical fibers are helically wound or lapped substantially concentrically around a core with adjacent lap segments touching each other within each concentric layer, thus providing a fiber optic cable having a substantially linear side lighting characteristic along its length.

The premise of the method is based upon the multiple uniform layers of fiber optic strands laid in substantially true concentric relation to a central core in such a manner that each optical fiber forming the adjacent lap segments contact each other, thus eliminating axial spacing between adjacent lap segments. This creates an overall smooth surface appearance and a very tight and efficient packing fraction ratio.

An essential element is the central core of fibers or strands around which the surrounding lap segments are laid. The preferred embodiments include a single strand which may have a diameter of 0.75 mm up to 3.0 mm as the core, or a helically twisted bundle of three or more strands having individual strand diameters of 0.75 mm up to 3.0 mm. The core may include a larger or smaller number of optical fibers or set of fibers than the surrounding lap segments. Moreover, the multiple fibers of the core need not be twisted and can be laid in parallel with each other in alignment with the longitudinal axis A of the core.

The core diameter may be determined using the following formulas:

$D_C$=diameter of individual optical or non-conductive core strands(s)

H=diameter of the centerline circle of the core structure

H(for a single strand core)=$D_C$

H(for three strand core)=1.15466*$D_C$

From the core centerline diameter the centerline diameters of the outer lap segments may be determined as follows:

N=outer layer number $D_S$=diameter of individual optical or non-conductive surrounding lap segment strands K=number of strands per layer G=diameter of the centerline circle of the layered helical lap segment When N=1, K is the number of strands in the first lap segment layer.

When N=1, G is the diameter of the centerline circle of the helical lap segment in the first layer.

$G_N = H + D(2*N)$ $K_N = \pi * G_N / D_S$

Therefore, $K_N = \pi * (H + (D_S * (2*N))) / D_S$

These formulas are representative preferred embodiment calculations and do not cover all potential embodiments. They also may not apply to all lap segment orientations. They shall be understood to define preferred embodiments, not to exclude alternate constructions.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. A fiber optic cable comprising:

a winding core;

a first group of optical fibers helically laid in a first layer around the core in concentric relation with the longitudinal axis of the core and with adjacent lap segments touching each other, thus substantially eliminating axial spacing between the lap segments along the length of the cable;

a second group containing a greater number of optical fibers helically laid in a second layer around the first layer in concentric relation with the longitudinal axis of the core and with adjacent lap segments touching each other; and, an optically transparent tubular sheath encompassing the winding core and optical fiber layers.

2. The lateral illumination fiber optic cable as set forth in claim 1, wherein the optical fibers in the helical layers are laid with a reverse direction of lay and an increased length of lay in each successive layer.

3. The lateral illumination fiber optic cable as set forth in claim 1, wherein the optical fibers are laid with reverse direction of lay and the same length of lay in each successive layer.

4. The lateral illumination fiber optic cable as set forth in claim 1, wherein the optical fibers are laid in the same direction of lay and with an increased length of lay in each successive layer.

5. The lateral illumination fiber optic cable as set forth in claim 1, wherein the optical fibers are laid in the same direction of lay and with the same length of lay in each successive layer.

6. The lateral illumination fiber optic cable as set forth in claim 1, wherein the optical fiber strands have a diameter in the range of about 0.7 mm to about 3.0 mm.

7. The lateral illumination fiber optic cable as set forth in claim 1, wherein the central core is constructed of passive (non-conductive) fibers or strands.

8. The lateral illumination fiber optic cable as set forth in claim 1, wherein the central core is constructed of a tubular member having a predetermined core diameter.

9. The lateral illumination fiber optic cable as set forth in claim 1, wherein the central core comprises multiple strands, either conductive or passive, that are laid in parallel with each other and in alignment with the longitudinal axis of the cable.

* * * * *